(12) United States Patent
Hallenstal et al.

(10) Patent No.: US 8,948,125 B2
(45) Date of Patent: Feb. 3, 2015

(54) METHOD AND SYSTEM FOR HANDOVER AND DOMAIN TRANSFER IN A TELECOMMUNICATIONS SYSTEM

(75) Inventors: Magnus Hallenstal, Täby (SE); Jari Tapio Vikberg, Järna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 709 days.

(21) Appl. No.: 12/812,391

(22) PCT Filed: Jan. 10, 2008

(86) PCT No.: PCT/SE2008/050029
§ 371 (c)(1),
(2), (4) Date: Aug. 30, 2010

(87) PCT Pub. No.: WO2009/088331
PCT Pub. Date: Jul. 16, 2009

(65) Prior Publication Data
US 2011/0176510 A1    Jul. 21, 2011

(51) Int. Cl.
*H04W 4/00*     (2009.01)
*H04W 8/02*     (2009.01)
(Continued)

(52) U.S. Cl.
CPC .......... *H04W 36/0022* (2013.01); *H04W 36/14* (2013.01)
USPC ........... 370/331; 370/338; 370/354; 370/401; 455/433; 455/439; 455/440; 455/517

(58) Field of Classification Search
CPC ...................................... H01L 12/66
USPC ........................ 370/331, 338, 352, 354, 401; 455/432.1, 433, 436, 439, 445, 446, 455/448, 440, 517
See application file for complete search history.

(56) References Cited

U.S. PATENT DOCUMENTS 6,845,236 B2 *   1/2005   Chang ................. 455/414.1
7,123,910 B2 *  10/2006   Lucidarme et al. ............ 455/434
(Continued)

FOREIGN PATENT DOCUMENTS

EP          1734782 A1 *  12/2006   ............... H04Q 7/38
WO    WO 2006092769 A1 *   9/2006   ............... H04Q 7/38
(Continued)

OTHER PUBLICATIONS

3rd Generation Partnership Project; Technical 1-28 Specification Group Services and System Aspects; General Packet Radio Service (GPRS) enhancements for Evolved Universal Terrestrial Radio Access Network (E-UTRAN) access (Release 8); 3GPP TS 23.401 V8.0.0 (Dec. 2007).

(Continued)

*Primary Examiner* — Alpus H Hsu

(57) ABSTRACT

A method and system for handover of a User Equipment (UE) from a source packet system to a target packet system in a packet switched domain of a wireless communications network while transferring the UE to a circuit switched domain. The target packet system includes a radio access network portion and a first core network portion. The circuit switched domain includes a second radio access network portion and a second core network portion. The UE performs an attachment/registration/update procedure towards the second core network portion and/or a signaling connection establishment before the handover between the source packet system and the target packet system is executed.

6 Claims, 12 Drawing Sheets

(51) Int. Cl.
*H04W 36/12* (2009.01)
*H04W 36/14* (2009.01)
*H04W 84/12* (2009.01)
*H04L 12/66* (2006.01)
*H04W 36/00* (2009.01)

(56) References Cited

U.S. PATENT DOCUMENTS

| | | | |
|---|---|---|---|
| 7,327,704 B2 * | 2/2008 | Sayeedi | 370/329 |
| 7,359,353 B2 * | 4/2008 | Sayeedi | 370/331 |
| 7,382,750 B2 * | 6/2008 | Wu | 370/331 |
| 7,522,585 B2 * | 4/2009 | Liu et al. | 370/354 |
| 7,680,489 B2 * | 3/2010 | Chang | 455/414.1 |
| 7,702,364 B2 * | 4/2010 | Ray et al. | 455/561 |
| 7,734,295 B2 * | 6/2010 | Chang | 455/445 |
| 7,822,419 B2 * | 10/2010 | Chang | 455/445 |
| 7,885,234 B2 * | 2/2011 | Ejzak | 370/331 |
| 7,995,562 B2 * | 8/2011 | Purnadi et al. | 370/352 |
| 8,275,379 B2 * | 9/2012 | Vikberg et al. | 455/436 |
| 8,325,675 B2 * | 12/2012 | Wu et al. | 370/331 |
| 8,457,063 B2 * | 6/2013 | Wu et al. | 370/330 |
| 8,743,709 B1 * | 6/2014 | Stegall | 370/252 |
| 2004/0259549 A1 | 12/2004 | Ejzak et al. | |
| 2007/0021127 A1 * | 1/2007 | Zheng | 455/456.1 |
| 2007/0238466 A1 * | 10/2007 | Buckley et al. | 455/445 |
| 2008/0026752 A1 * | 1/2008 | Flore et al. | 455/435.2 |
| 2008/0069050 A1 * | 3/2008 | Dutta et al. | 370/331 |
| 2008/0123596 A1 * | 5/2008 | Gallagher et al. | 370/331 |
| 2009/0034472 A1 * | 2/2009 | Purnadi et al. | 370/331 |
| 2009/0036130 A1 * | 2/2009 | Diachina et al. | 455/436 |
| 2009/0036131 A1 * | 2/2009 | Diachina et al. | 455/436 |
| 2009/0097476 A1 * | 4/2009 | Roux et al. | 370/352 |
| 2009/0156213 A1 * | 6/2009 | Spinelli et al. | 455/436 |
| 2010/0142488 A1 * | 6/2010 | Zhang et al. | 370/332 |
| 2010/0195616 A1 * | 8/2010 | Vikberg et al. | 370/331 |
| 2010/0246530 A1 * | 9/2010 | Pehrsson et al. | 370/331 |
| 2010/0260105 A1 * | 10/2010 | Keller et al. | 370/328 |
| 2010/0303041 A1 * | 12/2010 | Diachina et al. | 370/331 |
| 2010/0309886 A1 * | 12/2010 | Vikberg et al. | 370/332 |
| 2011/0110326 A1 * | 5/2011 | Rexhepi et al. | 370/331 |
| 2011/0268083 A1 * | 11/2011 | Ostrup et al. | 370/331 |
| 2013/0079016 A1 * | 3/2013 | Wu et al. | 455/439 |

FOREIGN PATENT DOCUMENTS

| | | | | |
|---|---|---|---|---|
| WO | WO 2006103517 A1 * | 10/2006 | | H04Q 7/38 |
| WO | WO 2006103547 A1 * | 10/2006 | | H04Q 7/38 |
| WO | WO 2006/123863 A2 | 11/2006 | | |

OTHER PUBLICATIONS

3rd Generation Partnership Project; Technical Specification Group Services and System Aspects;, Study on Circuit Switched (CS) domain services over evolved Packet Switched (PS) access; Stage 2 (Release 8) 3GPP TR 23.879 VI.0.0 (Dec. 2007).

3GPP TSG Geran Meeting #34; Shenzhen, CN May 14-18, 2007; Source: Ericsson. GP-070675.

3GPP TSG-Geran Meeting #34bis; Povoa De Varzim, PT, Jun. 25-29, 2007, G2-070184.

* cited by examiner

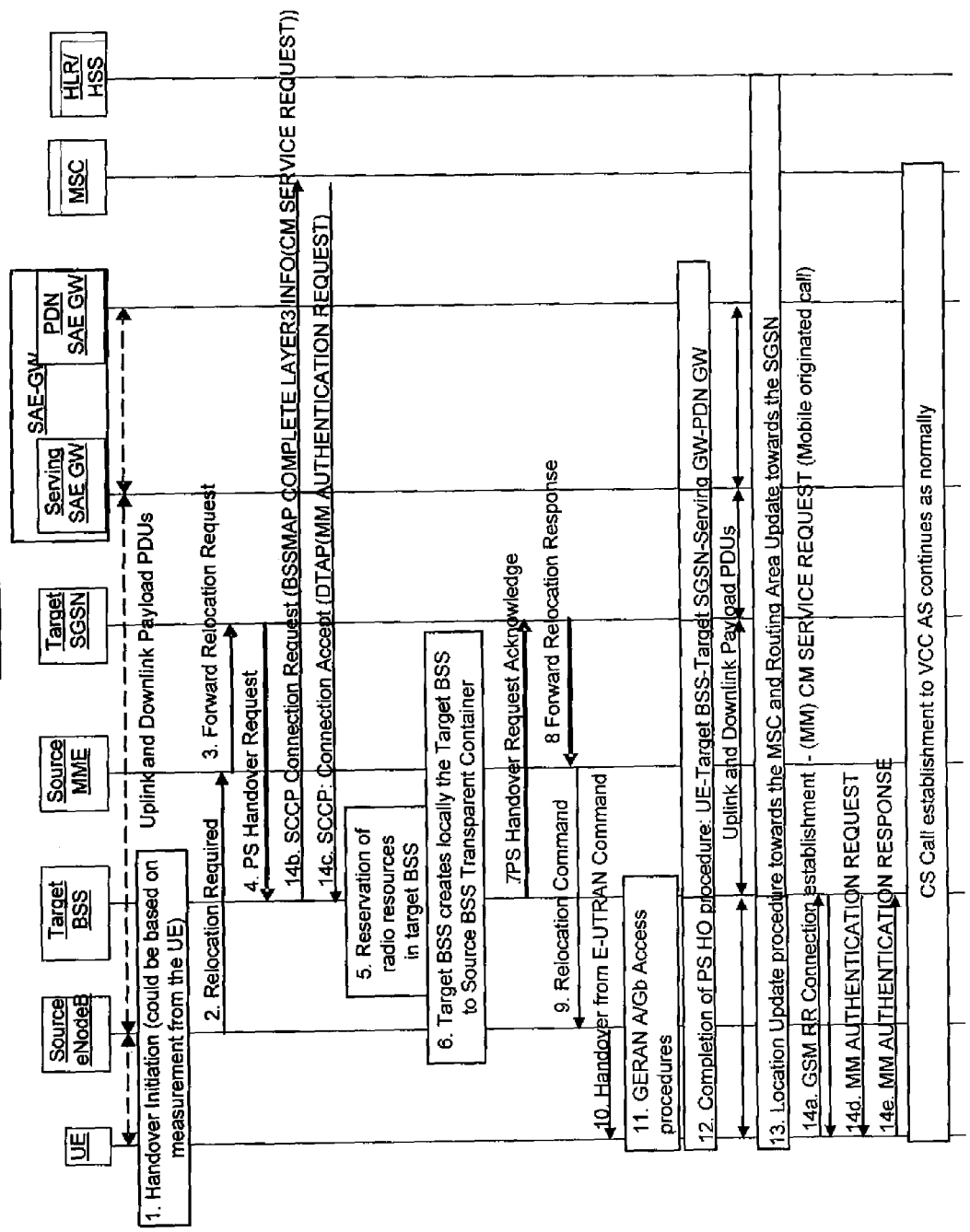

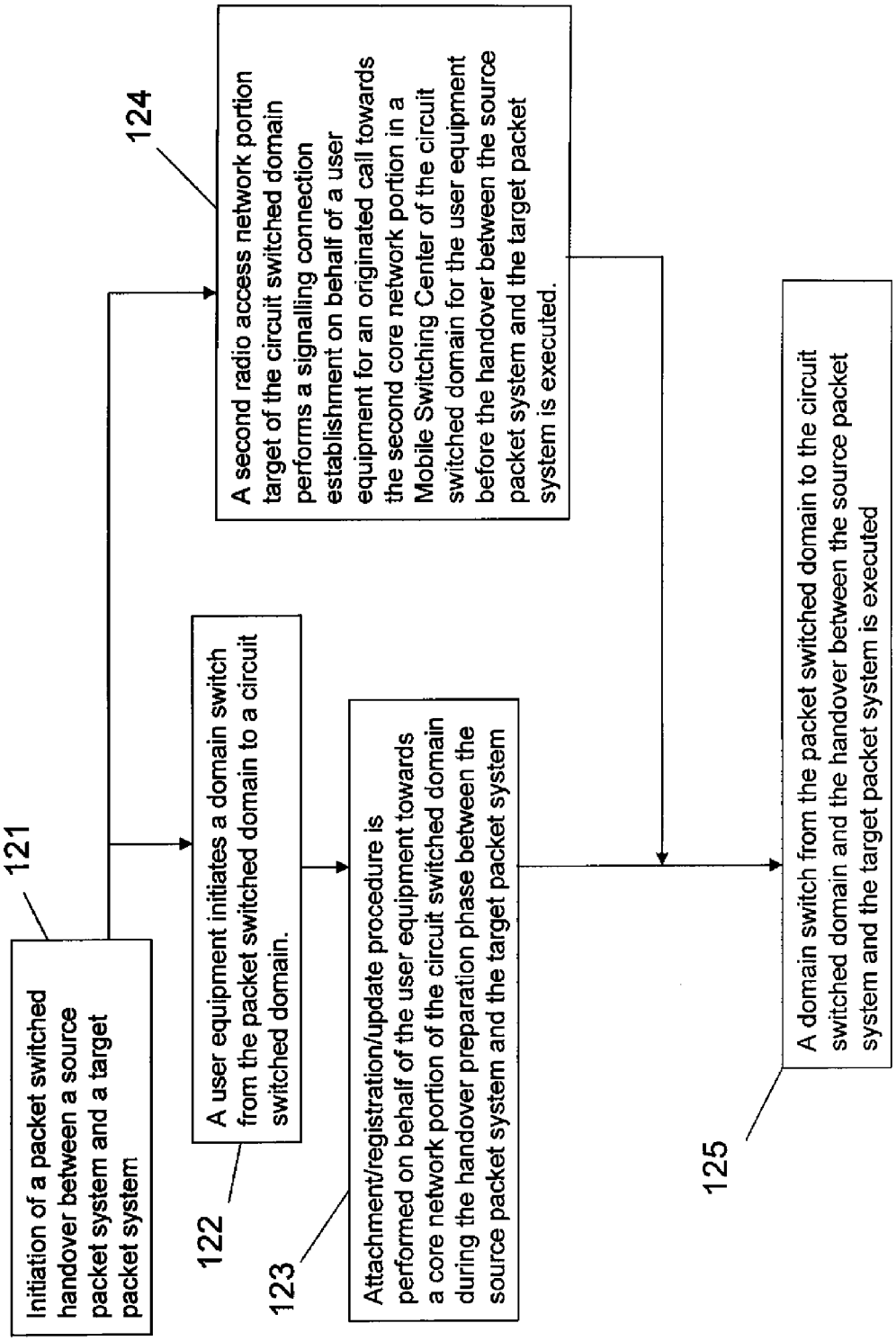

METHOD AND SYSTEM FOR HANDOVER AND DOMAIN TRANSFER IN A TELECOMMUNICATIONS SYSTEM

TECHNICAL FIELD

The invention relates to a method and system for a packet switched handover between a source packet system and a target packet system comprised in a packet switched domain, and a method and system for a domain switch between the packet switched domain and a circuit switched domain, both comprised in a wireless communications network.

BACKGROUND

In the 3rd Generation Partnership Project, 3GPP, ongoing specification work is performed for the establishment of operational performances for inter-work between Evolved Universal Terrestrial Radio Access Network, E-UTRAN, and GSM EDGE Radio Access Network, GERAN, and UTRAN. E-UTRAN is also known as Long Term Evolution, LTE, Radio Access Network, RAN, and is the RAN part for the System Architecture Evolution, SAE, Core Network, CN. The latest name for SAE is Enhanced Packet Core, EPC. Here, "Inter-work", as mentioned above, means that a User Equipment, UE, with active packet sessions is moving from LTE to GERAN coverage or in the other direction and the services using the active packet sessions are effectively moved to the target RAN and cell.

The current assumption is that both Packet Switched Handover (hereinafter called PS HO or PS handover), and enhanced Network Assisted Cell Change, eNACC, will be standardized for the purpose of moving between GERAN/UTRAN and LTE. It is also likely that PS HO can be used in both directions and that the eNACC only applies for the case when the UE is moving from LTE to GERAN. Both PS HO and eNACC are partly based on the same mechanisms.

In addition, work is ongoing in 3GPP to allow for the possibility to perform so called Inter-domain transfer from PS domain to CS domain. This domain transfer is applicable, for example, for the case when:
 i) a UE is using the packet bearers in LTE for Real-time services,
 ii) the UE is moving from LTE to GERAN coverage and
 iii) the target GERAN RAN/cell does not support real-time services in the PS domain.

One example is the handover of E-UTRAN Voice over Internet Protocol (IP), VoIP, call to CS voice resources in GERAN. This type of inter-RAT (Radio Access Technology) handover also requires PS to CS domain transfer, i.e. inter domain transfer.

There exists today a proposal (GP-070675) on how to perform the above mentioned Inter-domain transfer from E-UTRAN PS domain to GERAN CS domain. This proposal is currently getting more and more support in the standardization of GERAN. One main principle is that the target RAT/cell decides whether Inter-Domain change needs to be performed. If the target RAT/cell decides to perform this Inter-Domain change, then both PS and CS radio resources are allocated for the UE during the packet switched handover preparation phase, after the target BSS has received the PS Handover Required message. The allocated resources are included in a new message (e.g. Inter-Domain Handover Command) that in turn is included in the Target BSS to Source BSS Transparent Container which is included in the PS Handover Request Acknowledge message.

When the related steps in the PS Handover preparation phase signaling are performed, the UE is commanded to perform combined PS/CS Handover (or this could be also called Inter Domain, ID, Handover) to the target GERAN cell.

The next step is then that the UE would need to perform Location Area Update, LAU, towards the MSC controlling the target GERAN cell. Please note that this step could be optional if the UE is already CS Attached in the MSC. This could be the case for example because of some CSoLTE MM procedures performed via LTE. If Gs-interface is supported in the core network CN controlling the target GERAN cell, then a Combined Routing Area Update and Location Area update could be possible. Otherwise, the UE would need to perform normal location area update towards the MSC.

The next step after successful Location Area update, LAU, is that a Voice Call Continuity, VCC, application in the MS would need to make a CS call towards the VCC Application Server, AS, in the IMS CN. Once this call establishment is successfully performed, the VCC AS may route the call leg via the CS domain and finalize the Inter-Domain change.

The Location Update procedure depends on Network operation mode. When the target network is in Network Operation Mode I, i.e. the Gs interface between the SGSN and the MSC is supported, the terminal performs Combined Routing Area (RA) and Location Area (LA) Update procedures. However, when the target network is in Network Operation Mode II or III (i.e. the Gs interface between the SGSN and the MSC is not supported). In this case, the terminal performs separate Location Update and Routing Area Update procedures.

The problem with the existing solution is that the proposed sequence for the different scenarios takes time because of interruptions related to the Inter-Domain change.

SUMMARY

There exists a need for an improved and faster sequence in a wireless communications system where domain switch and handover are made.

The object of the invention is to remedy the deficiencies in prior art in order to find an improved and faster combined packet switched handover (hereinafter called PS HO or PS handover) and domain switch method for a wireless communications network. The network comprises a user equipment, a packet switched domain (hereinafter called PS domain) and a circuit switched domain (hereinafter called CS domain).

The packet switched domain comprises a source packet system and a target packet system.

The target packet system comprises a target base station system (hereinafter called target BSS) comprising a base station controller BSC (hereinafter called BSC) and one or more Base Transceiver Stations BTS (hereinafter called BTS) and a target serving GPRS support node, target SGSN.

The target packet system comprises a first radio access network portion and a first core network portion. The first radio access network portion is comprised in the target BSS/BSC/BTS and the first core network portion is comprised in the target SGSN. It is obvious that there also exist other nodes in the different network portions according to prior art.

The circuit switched domain comprises a second radio access network portion and a second core network portion.

The second radio access network portion is comprised in the target BSS/BSC/BTS and the second core network portion is comprised in a Mobile Switching Center (hereinafter called MSC).

According to the invention, the user equipment performs a domain switch from the packet switched domain to the circuit switched domain. In addition, an attachment/registration/update procedure is performed regarding the user equipment towards the second core network portion of the circuit switched domain during the packet switched handover preparation phase between the source packet system and the target packet system. The attachment/registration/update procedure may comprise one or several parts of a Location Area Update and Routing Area Update and CS Call establishment.

According to the invention the second radio access network portion of the circuit switched domain performs a signalling connection establishment for a user equipment mobile originated call towards the second core network portion of the circuit switched domain for the user equipment before the handover between source packet system and the target packet system is executed.

One advantage of the invention is that the steps after the Circuit Switched to Packet Switched handover are optimized due to the attachment/registration/update procedure and/or the signalling connection establishment, which gives that the total interrupt time related to the Inter-Domain change is minimized.

It should be noted that the above attachment/registration/update procedure and the signalling connection establishment can be performed separately or in combination.

Here it is appropriate to refer to prior art in order to understand the invention. In prior art the following steps are proposed.

1. do PS handover
2. register in CS domain
3. setup up call towards VCC
4. do the domain transfer The present invention performs step 2 and at least a part of step 3 during step 1.

Here domain transfer refers to when a voice call from the user equipment, which is carried over IP, is transferred to the CS domain. The PS handover in the PS domain, i.e. the handover between the source packet system and the target packet system, has already happened at the time of the domain transfer.

Hence, the invention refers to optimization of a domain switch from the Packet Switched, PS, domain to the Circuit Switched, CS, domain by performing separately or in combination the following procedures during the PS handover preparation phase, i.e. the preparation procedure of the domain switch. The procedures are: Location Update, Combined Routing Area and Location Area, Update, and CS Call establishment. All of the procedures give the benefit of an improved latency in the sense that the time between the initiation of the PS handover procedure and the execution of the domain transfer is decreased.

The basic concept is that the actions taken after the combined PS and CS Handover are optimized. The relevant actions to optimize are the Routing Area and Location Area update, or the combination of the both, and/or the CS Call establishment to improve the performance by decreasing the interrupt time.

In prior art the Location Area update and/or Combined Routing Area and Location Area update after the PS HO unnecessarily delay the initiation of the CS Call establishment.

The optimization is performed so that the target radio access network (either the first radio access network portion or the second radio access network portion), e.g. GSM BSS/BSC, after it has decided that an Inter-Domain change is needed, initiates at least one of these procedures towards the CS core network, i.e. the second core network. The initiation of one of the procedures is made on behalf of the UE already during the PS Handover preparation phase. This means that once the PS Handover Execution phase is performed, the user equipment may already be CS attached in the CS core network, i.e. attached in the second core network, and the CS call establishment towards VCC AS may be initiated immediately.

Regarding the optimization of the CS call establishment towards VCC AS, the ciphering key sequence number, CKSN, is to be indicated in the CM Service Request message to the MSC. This means that it is possible to indicate that the user equipment does not hold any CKSN. New keys are then created for the user equipment as part of the normal authentication and ciphering mode command.

The attachment/registration/update procedure may be triggered by the first radio access network portion of the target packet system or by the first core network portion of the target packet system.

The attachment/registration/update procedure may be triggered by the second radio access network portion of the target circuit switched domain.

As mentioned above, the Location update optimization can be performed together with the CS Call establishment optimization.

Depending on Network Operation Mode in the Target Radio Access Network (hereinafter called RAN) and whether the user equipment was already CS attached to the CS core network (hereinafter called CN) there are different possibilities for the method. The different possibilities will be discussed below in connection to a number of drawings.

In LTE the source packet system comprises a source transceiver node eNodeB, a control node MME, a user plane node SAE-GW that comprises Serving Gateway and PDN Gateway functionalities. The term SAE-GW is further used in this application.

The invention is not limited to an LTE source packet system according to the above, but the source packet system may also be a 3G/UTRAN/WCDMA system comprising a transceiver node, source NodeB, a source Radio Network controller, source RNC, and source Serving GPRS support node, source SGSN. The source NodeB and source RNC then replaces the source eNodeB, and the source SGSN replaces the source MME and the source Serving Gateway.

BRIEF DESCRIPTION OF THE DRAWINGS

The invention will below be explained in connection to a number of drawings, where;

FIG. 11 schematically shows a signal path diagram of optimized CS Call establishment according to the invention, and where;

FIG. 12 schematically shows a flow chart over the method according to the invention.

DETAILED DESCRIPTION

In order to understand the invention, prior art will be described below in connection to FIGS. 1-7. FIGS. 1-7 refers to a long term evolution system comprising a user equipment UE, a source transceiver node eNodeB, a target base station system target BSS, a source control node source MME, a target Serving GPRS Support Node target SGSN, a user plane node SAE-GW that comprises a Serving Gateway and PDN Gateway functionalities and a Mobile Switching Center MSC controlling a target GERAN cell, a home location register HLR and a Home subscriber server HSS.

Figure 1:
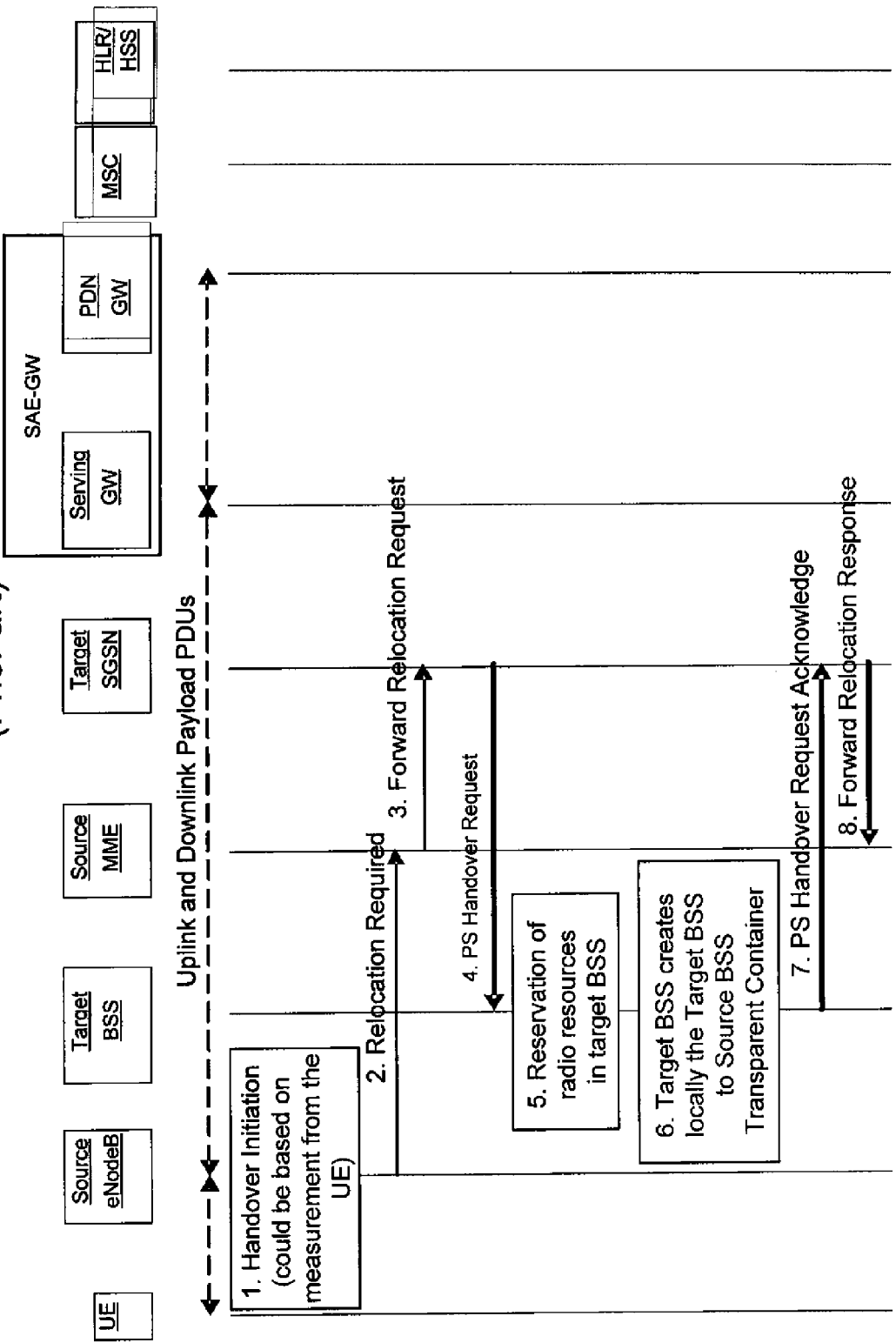
FIG. 1 schematically shows a signal path diagram over a PS Handover Preparation Phase; Inter-RAT/mode, Inter-SGSN case (LTE→GERAN A/Gb) mode according to prior art.

FIG. 1 schematically shows a signal path diagram over a PS Handover Preparation Phase; Inter-RAT/mode, Inter-SGSN case (LTE 4 GERAN A/Gb) mode according to prior art.

FIG. 1 shows the following steps:

1. A handover is initiated. The handover could be based on measurement from the UE.

2. The source eNode B transmits a signal Relocation Required message to the source MME.

3. The source MME transmits a Forward Relocation Request message to the target SGSN.

4. The target SGSN transmits a PS Handover Request message to the target BSS.

5. The target BSS makes reservation of radio resources

6. Target BSS creates locally the Target BSS to Source BSS Transparent Container.

7. The target BSS transmits a PS Handover Request Acknowledge message to the target SGSN.

8. The target SGSN transmits a Forward Relocation Response message to the source MME.

Figure 2:
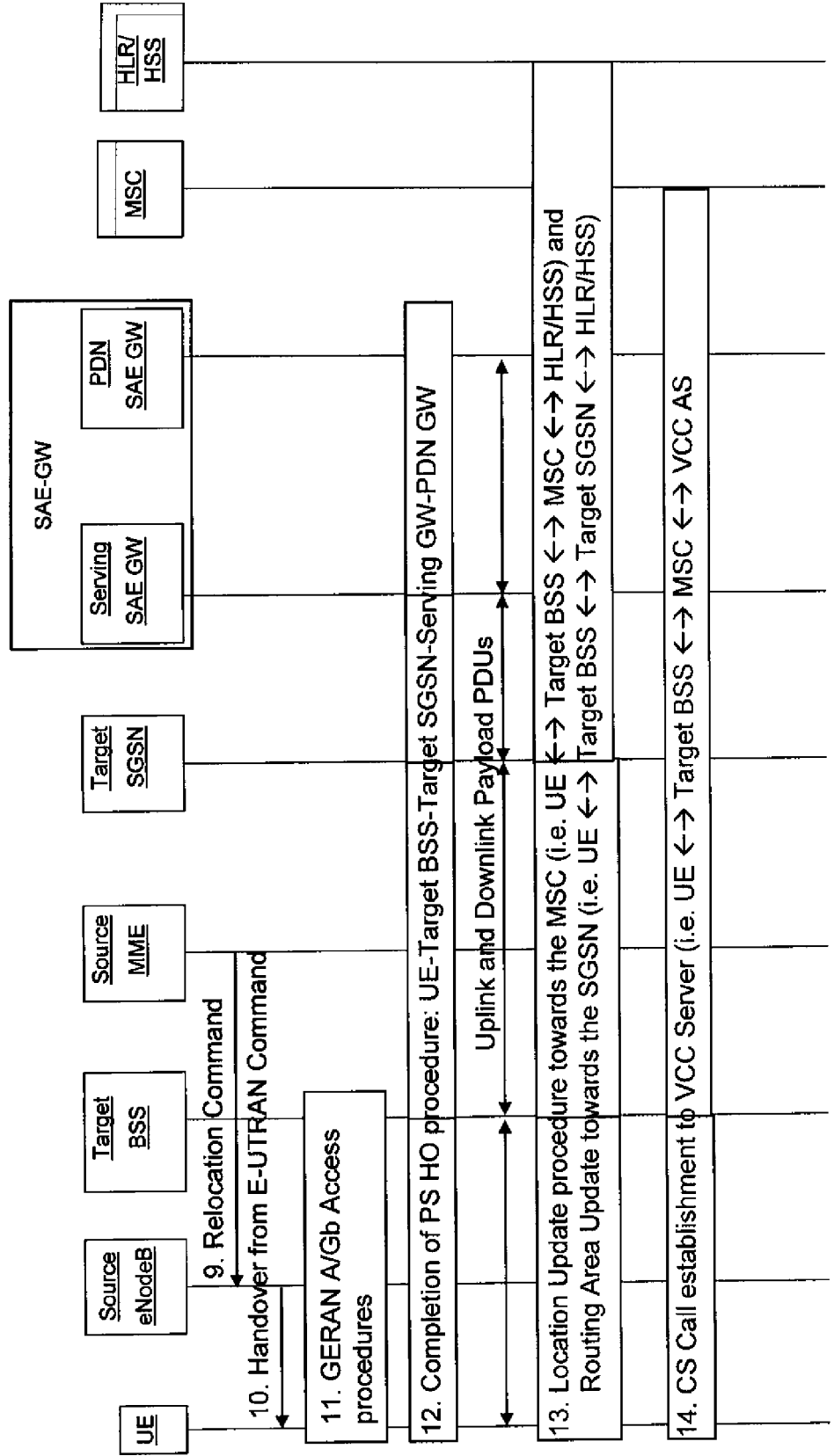
FIG. 2 schematically shows a signal path diagram over a PS Handover Execution Phase and Inter-Domain change related actions, according to prior art.

FIG. 2 schematically shows a signal path diagram over a PS Handover Execution Phase and Inter-Domain change related actions, according to prior art and is a continuation of FIG. 1.

FIG. 2 shows the following steps:

9. The source MME transmits a Relocation Command message to the source eNodeB.

10. The source eNodeB transmits a Handover from E-UTRAN Command message to the UE.

11. GERAN A/Gb Access procedures are performed in the MSC and the target SGSN.

12. Completion of PS HO procedure involving the UE, the Target BSS, the Target SGSN and the SAE-GW 13. Location Update procedure towards the MSC involving the UE, the target BSS, the MSC and the HLR/HSS; and Routing Area Update towards the SGSN involving the UE, the Target BSS, the Target SGSN and the HLR/HSS.

14. CS Call establishment to a VCC Server (see FIG. 6) involving the UE, the Target BSS, the MSC and the VCC AS In FIG. 1 Uplink and Downlink Payload Packet Data units PDUs are routed from the UE to the source eNOdeB and to the serwing GW and PDN GW in the SAE-GW, and vice versa. After step 12 in FIG. 2 Uplink and Downlink Payload PDUs are routed from the UE to the target BSS to the SGSN and to the serwing GW and PDN GW in the SAE-GW, and vice versa.

The next step is then step 14 where the UE needs to perform Location Area Update, LAU, towards the MSC controlling the target GERAN cell. This step could be optional if the UE is already CS Attached in the MSC. This could be the case for example because of some CSoLTE MM procedures performed via LTE. If Gs-interface is supported in the core network CN controlling the target GERAN cell, then a Combined Routing Area Update and Location Area update could be possible. Otherwise, the UE would need to perform normal location area update towards the MSC.

FIG. 1 is based on the figures in prior art document GP-070675 and shows the main principles of this solution. One main principle is that the target RAT (Radio Access Technology)/cell decides whether Inter-Domain change needs to be performed. If the target RAT/cell decides to perform this Inter-Domain change, then both PS and CS radio resources are allocated for the user equipment UE during the PS handover preparation phase (i.e. at step 5 in FIG. 1, after the target Base Station System target BSS has received the PS Handover Required message in step 4). In step 6, the allocated resources are included in a new message (e.g. Inter-Domain Handover Command) that in turn is included in the Target BSS to Source BSS Transparent Container which is included in step 7 in the PS Handover Request Acknowledge message.

FIG. 1 shows the PS Handover preparation phase signaling and once the related steps are performed, the user equipment UE is commanded to perform combined PS/CS Handover (or this could be also called Inter Domain, ID, Handover) to the target GERAN cell as depicted in FIG. 2.

The next step is then that the user equipment UE would need to perform Location Area Update, LAU, towards a Mobile Switching Center MSC controlling the target GERAN cell. Please note that this step could be optional if the user equipment UE is already circuit switched CS Attached in the MSC. This could be the case for example because of some CSoLTE MM procedures performed via LTE. If Gs-interface is supported in the core network CN controlling the target GERAN cell, then a Combined Routing Area Update and Location Area update could be possible. Otherwise, the user equipment UE would need to perform normal location area update towards the Mobile Switching Center MSC.

The next step after successful Location Area update, LAU, is that a Voice Call Continuity, VCC, application in the MS would need to make a CS call towards the VCC Application Server, AS, in the IMS CN. Once this call establishment is successfully performed, the VCC AS may route the call leg via the CS domain and finalize the Inter-Domain change.

Figure 3:
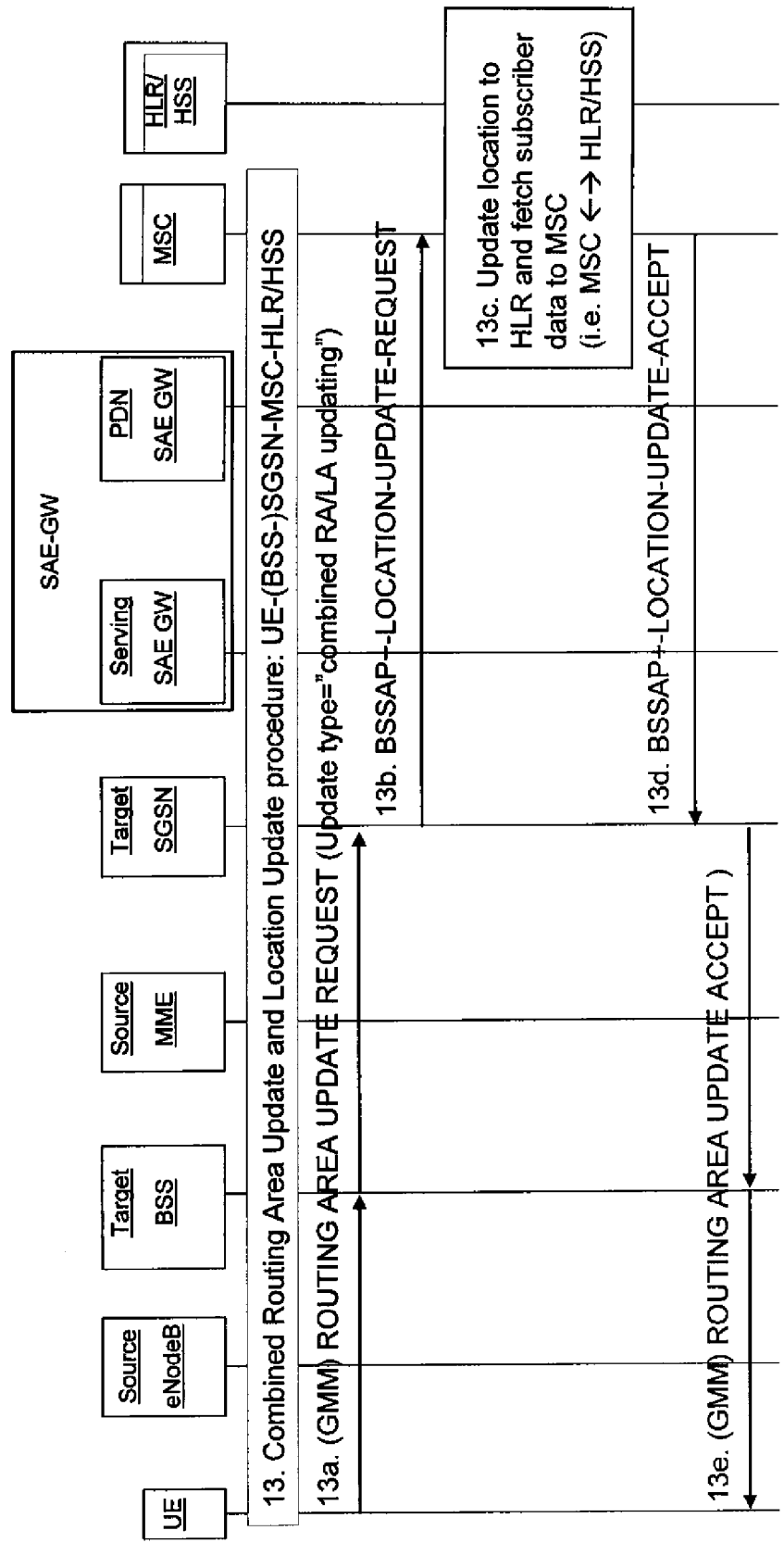
FIG. 3 schematically shows a detailed signal path diagram of step 13 in FIG. 2 when Gs-interface is supported, according to prior art.
Figure 4:
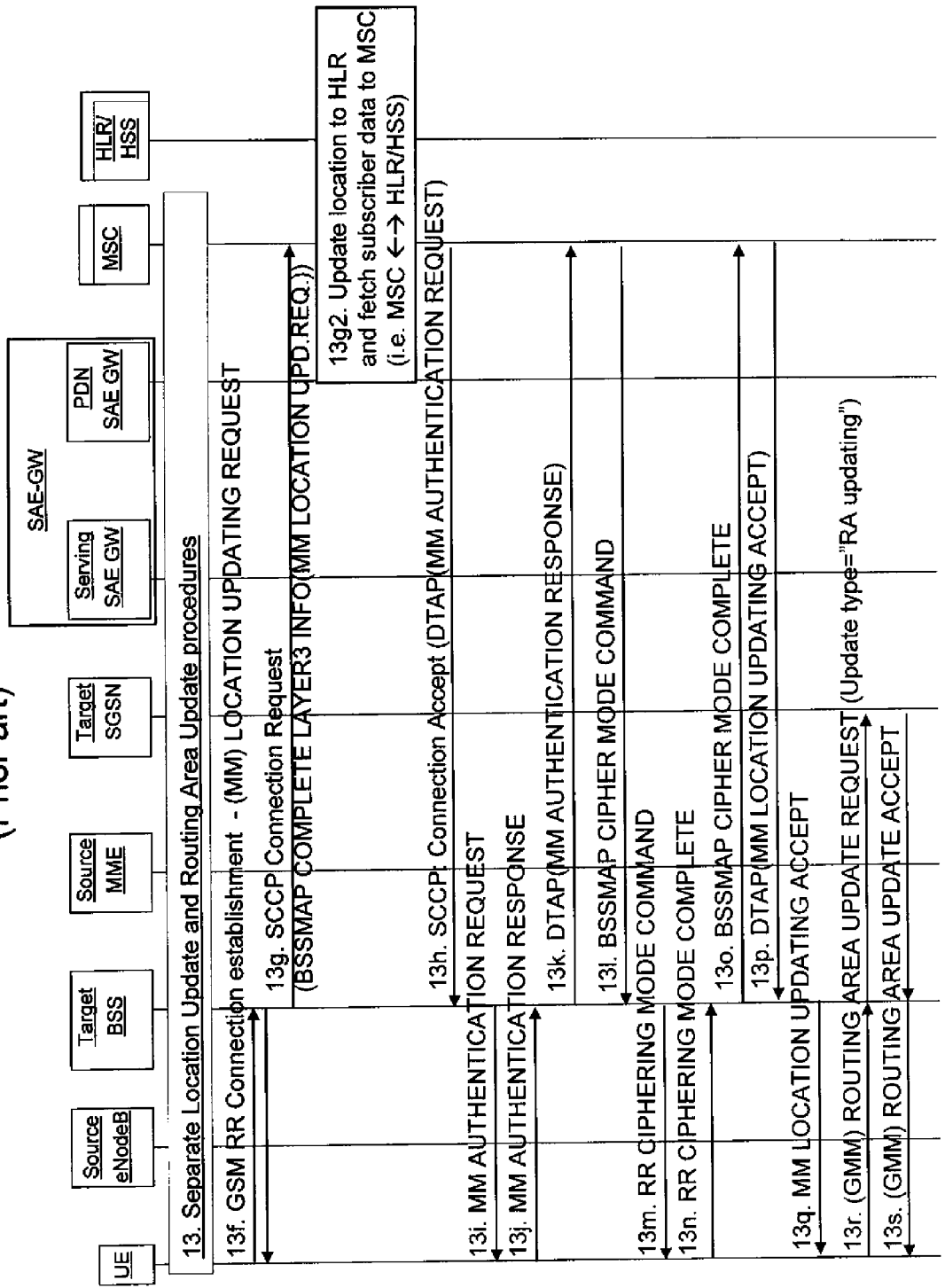
FIG. 4 schematically shows a detailed signal path diagram of step 13 in FIG. 2 when Gs-interface is not supported, according to prior art.
Figure 5:
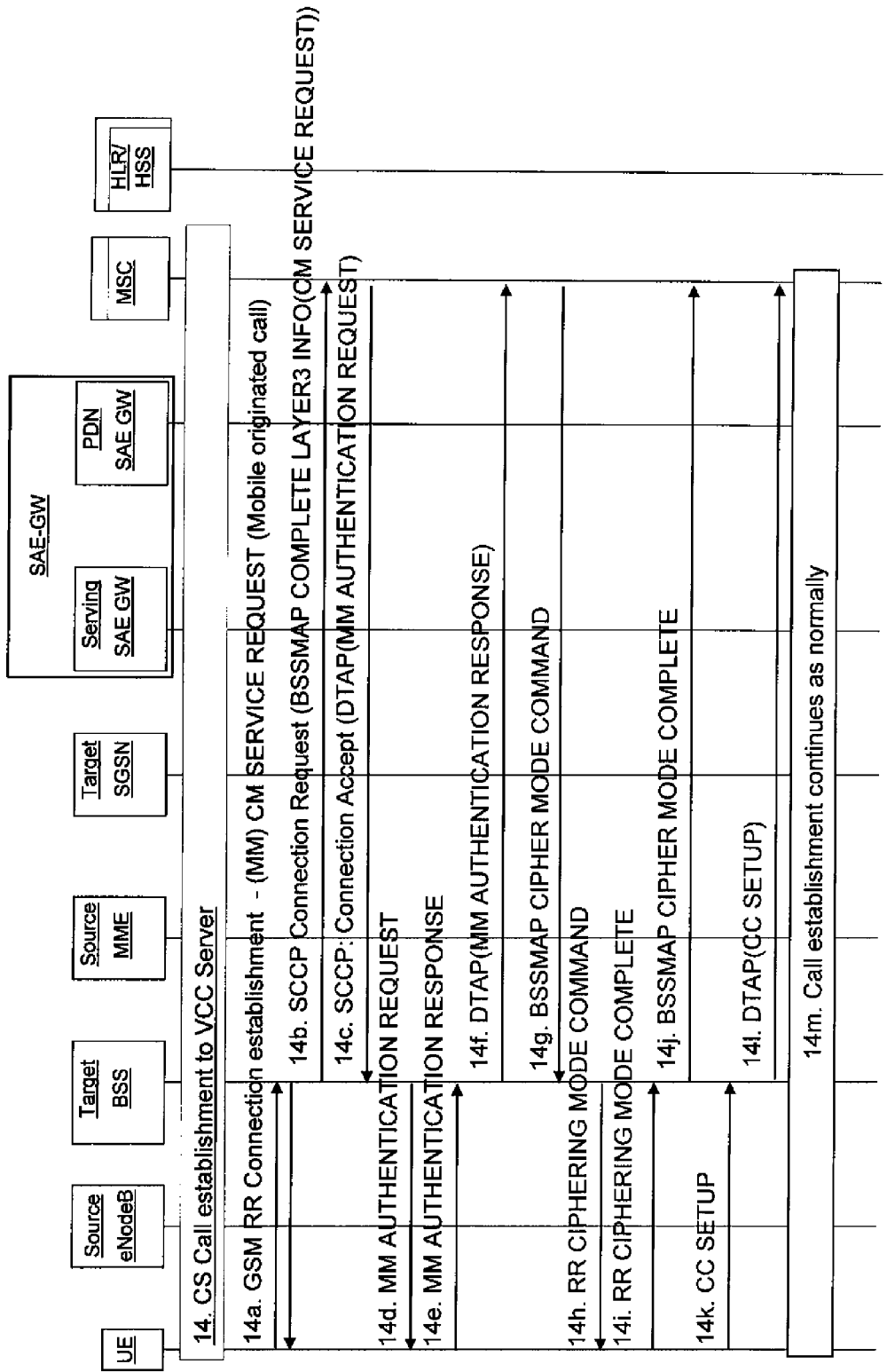
FIG. 5 schematically shows a detailed signal path diagram of the first parts of step 14 in FIG. 2, according to prior art.

As mentioned before, FIG. 2 shows the general principle of the PS Handover execution phase. The Location Update procedure in step 13 and the CS call to the VCC AS in step 14 are further described in the FIGS. 3, 4 and 5. FIGS. 3 and 4 describe two different possibilities for the step 13 and FIG. 5 shows the initial actions for step 14. The described steps are shown here in detailed way as these are the two sequences optimized as part of this invention. It is also obvious that the sequences shown are exemplary and that there could be other procedures performed depending on the network configuration.

FIG. 3 shows the details of step 13 when the target network is in Network Operation Mode I, i.e. the Gs interface between the SGSN and the Mobile Switching Center MSC is supported. In this case, the terminal performs Combined Routing Area (RA) and Location Area (LA) Update procedure. The Combined Routing Area Update and Location Update procedure involves the UE the target BSS, the target SGSN, the MSC and the HLR/HSS.

Step 13 can be broken down to the following steps:

13a. The UE transmits a (GMM) ROUTING AREA UPDATE REQUEST (Update type="combined RA/LA updating") message to the target BSS.

13b. The target BSS transmits a BSSAP+-LOCATION-UPDATE-REQUEST message to the target SGSN.

13c. The target SGSN transmits an Update location message to the HLR and fetches subscriber data to the MSC, i.e. the MSC and the HLR/HSS intercommunicates.

13d. The MSC transmits a BSSAP+-LOCATION-UPDATE-ACCEPT message to the target SGSN.

13e. The target SGSN transmits a (GMM) ROUTING AREA UPDATE ACCEPT message to the target SGSN that transmits the message further to the UE.

FIG. 4, on the other hand, shows the details of step 13 when the target network is in Network Operation Mode II or III (i.e. the Gs interface between the target serving GPRS support node target SGSN and the Mobile Switching Center MSC is not supported). In this case, the terminal performs separate Location Update and Routing Area Update procedures.

The Combined Routing Area Update and Location Update procedure involves the UE the target BSS, the target SGSN, the MSC and the HLR/HSS.

Step 13 can be broken down to the following steps:

13f. The UE and the target BSS intercommunicates regarding a GSM RR Connection establishment (MM) LOCATION UPDATING REQUEST.

13g. The target BSS transmits a SCCP Connection Request (BSSMAP COMPLETE LAYER 3 INFO(MM LOCATION UPD. REQ.)) message to the MSC.

13g2. The MSC transmits an Update location to the HLR and fetches subscriber data from HLR/HSS.

13h. The MSC transmits an SCCP: Connection Accept (DTAP(MM AUTHENTICATION REQUEST) message to the target BSS.

13i. The target BSS transmits an MM AUTHENTICATION REQUEST message to the UE.

13j. The UE transmits an MM AUTHENTICATION RESPONSE message to the target BSS.

13k. The target BSS transmits a DTAP(MM AUTHENTICATION RESPONSE) message to the MSC.

13l. The MSC transmits a BSSMAP CIPHER MODE COMMAND message to the target BSS.

13m. The target BSS transmits an RR CIPHERING MODE COMMAND to the UE.

13n. The UE transmits an RR CIPHERING MODE COMPLETE message to the target BSS.

13o. The target BSS transmits a BSSMAP CIPHER MODE COMPLETE message to the MSC.

13p. The MSC transmits a DTAP(MM LOCATION UPDATING ACCEPT) message to the target BSS.

13q. The target BSS transmits an MM LOCATION UPDATING ACCEPT message to the UE.

13r. The UE transmits a (GMM) ROUTING AREA UPDATE REQUEST (Update type="RA updating") message to the target SGSN.

13s. The target SGSN transmits a (GMM) ROUTING AREA UPDATE ACCEPT) message to the target BSS that transmits the message to the UE.

FIG. 5 shows the initial details of step 14 when the CS Call is established towards the VCC AS Server Step 14 can be broken down to the following steps 14a. The UE transmits a GSM RR Connection establishment (MM) CM SERVICE REQUEST (Mobile originated call) message to the target BSS.

14b. The target BSS transmits an SCCP Connection Request (BSSMAP COMPLETE LAYER 3 INFO(CM SERVICE REQUEST)) message to the MSC 14c. The MSC transmits a SCCP: Connection Accept (DTAP(MM AUTHENTICATION REQUEST) message to the target BSS.

14d. The target BSS transmits a MM AUTHENTICATION REQUEST message to the UE.

14e. The UE transmits a MM AUTHENTICATION RESPONSE message to the target BSS.

14f. The target BSS transmits a DTAP(MM AUTHENTICATION RESPONSE) message to the MSC.

14g. The target MSC transmits a BSSMAP CIPHER MODE COMMAND message to the target BSS.

14h. The target BSS transmits a RR CIPHERING MODE COMMAND message to the UE.

14i. The UE transmits a RR CIPHERING MODE COMPLETE message to the target BSS.

14j. The target BSS transmits a BSSMAP CIPHER MODE COMPLETE message to the MSC.

14k. The UE transmits a CC SETUP message to the target BSS.

14l. The target BSS transmits a DTAP(CC SETUP) message to the MSC.

14m. Call establishment continues as normally

Figure 6:
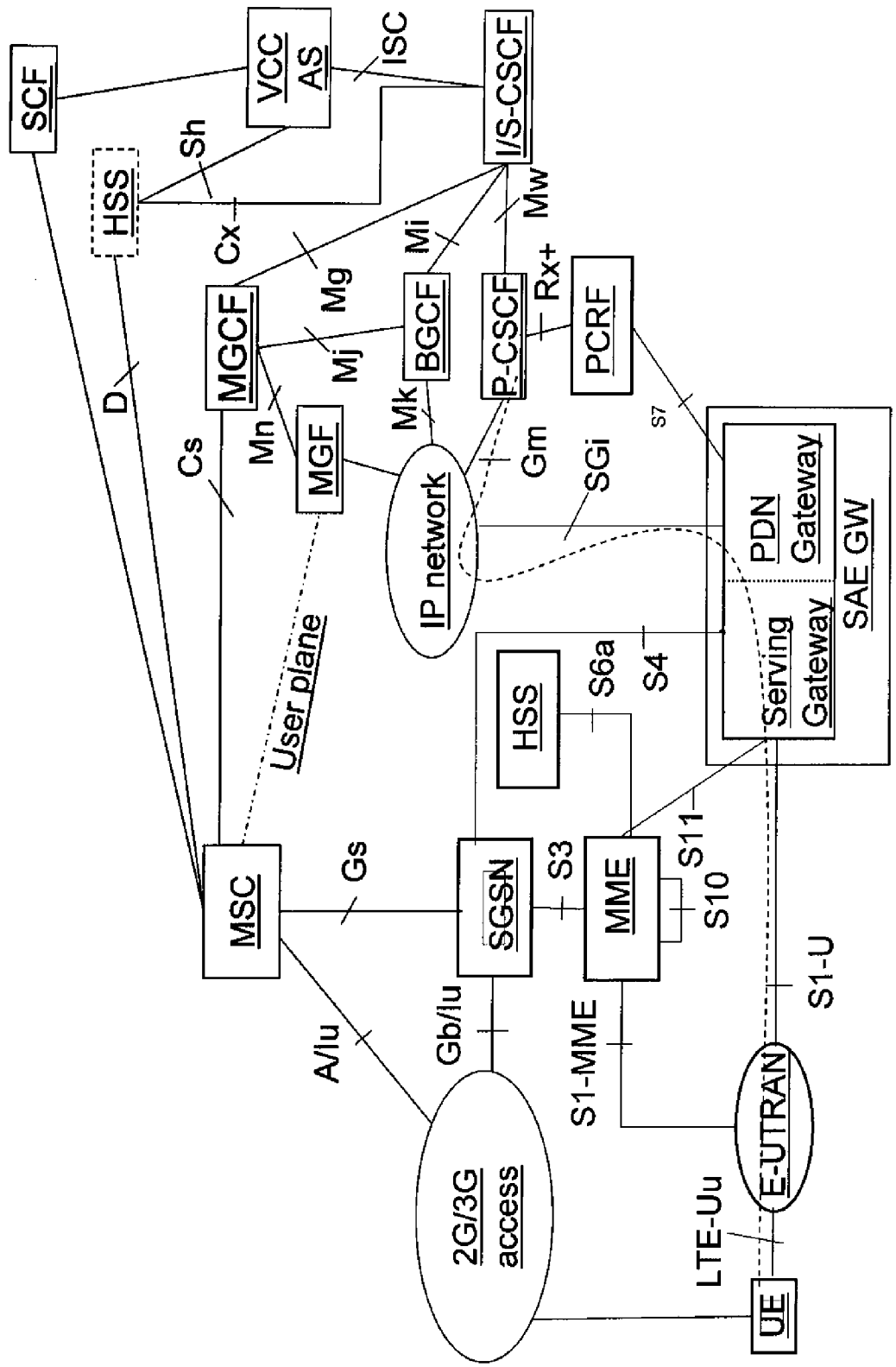
FIG. 6 is a block diagram that schematically shows an overview of the architecture of an LTE network system according to prior art.
Figure 7:
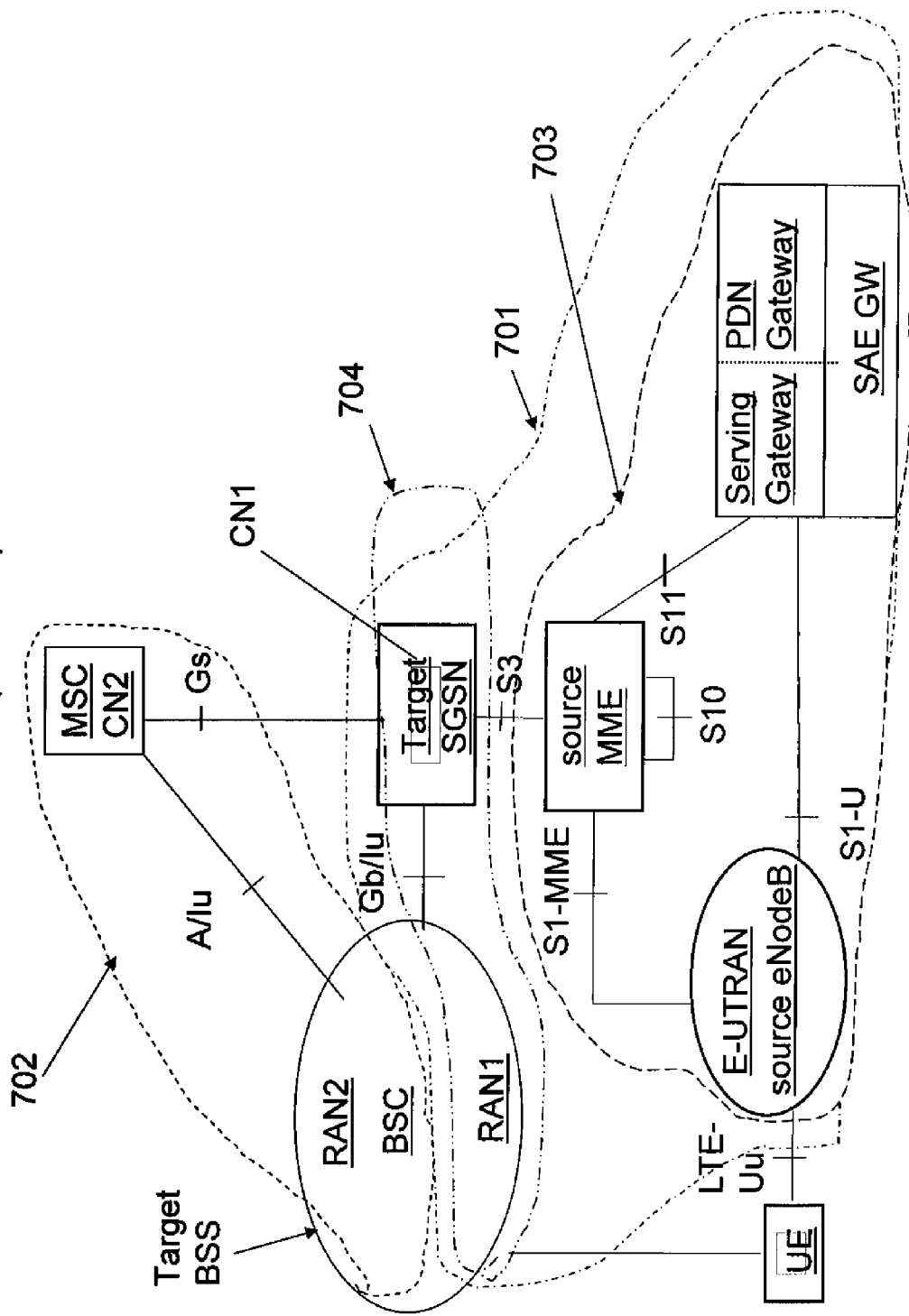
FIG. 7 is a block diagram that schematically shows the architecture of the LTE network system in FIG. 6 in more detail.

FIG. 6 shows an overview of the architecture of a Long Term Evolution (hereinafter called LTE) network system and FIG. 7 shows the architecture of the LTE network system in more detail. FIGS. 6 and 7 are intended to be an aid in reading the description of the invention in connection to FIGS. 8-11. FIGS. 6 and 7 are also relevant for understanding the prior art described in connection to FIGS. 1-5 above.

According to FIGS. 6 and 7, the network comprises a user equipment UE, a packet switched domain 701 and a circuit switched domain 702. The packet switched PS domain comprises a source packet system 703 and a target packet system 704. In LTE the source packet system 703 comprises a source transceiver node eNodeB, a control node MME, a user plane node SAE-GW that consists of Serving Gateway and PDN Gateway functionalities. The term SAE-GW is used in this application for the Serving Gateway and PDN Gateway functionalities. The target packet system 704 comprises a target base station system, target BSS comprising a base station controller BSC and a number of Base Transceiver Stations BTS and a target serving GPRS support node, target SGSN. The target packet system 704 comprises a first radio access network RAN1 portion and a first core network CN1 portion. The first radio access network RAN1 portion is comprised in the target BSS/BSC/BTS and the first core network CN1 portion is comprised in the target serving GPRS support node target SGSN. It is obvious that there also exist other nodes in the different network portions.

The circuit switched domain 702 comprises a second radio access network RAN2 portion and a second core network CN2 portion. The second radio access network RAN2 portion is comprised in the target BSS/BSC/BTS and the second core network CN2 portion is comprised in a Mobile Switching Center MSC.

The invention is not limited to an LTE source packet system according to FIGS. 1-11, but the source packet system may also be a 3G/UTRAN/WCDMA system comprising a transceiver node, source NodeB, a source Radio Network controller, source RNC, and source Serving GPRS support node, source SGSN. With reference to the drawings, the source NodeB and source RNC then replaces the source eNodeB, and the source SGSN replaces source MME and source Serving Gateway.

According to the invention, the user equipment UE performs a domain switch from the packet switched domain 701 to the circuit switched domain 702. Furthermore, an attachment/registration/update procedure is performed regarding the user equipment UE towards the second core network CN2 portion of the circuit switched domain during the handover preparation phase between the source packet system 703 and the target packet system 704. The attachment/registration/update procedure may comprise one or several parts of a Location Area Update, LAU, and Routing Area Update, RAU, and CS Call establishment.

According to the invention the second radio access network RAN2 portion of the circuit switched domain 702 performs a signalling connection establishment for a user equipment UE mobile originated call towards the second core network CN2 portion of the circuit switched domain 702 for the user equipment UE before the handover between source packet system 703 and the target packet system 704 is executed.

The above attachment/registration/update procedure and the signalling connection establishment may be performed separately or in combination.

Hence, the description of this invention is divided into many different parts depending on which of the mentioned procedures, i.e. Combined Routing Area, RA, and Location Area, LA update, plain Location Area update and/or the CS Call establishment, is optimized. This depends on Network Operation Mode in the Target Radio Access Network RAN and whether the user equipment UE was already CS attached to the CS Core Network or not.

The Network Operation Mode defines whether the Gs-interface is being used between the target serving CPRS support node target SGSN and the Mobile Switching Center MSC and whether the Combined RA and LA Update procedure is possible.

The possibilities are described in the following:
1 Optimize Combined Routing Area, RA, and Location Area, LA update procedure i.e. UE is not CS attached in the Target CN, Gs-interface is used
2 Optimize normal Location Area update i.e. UE is not CS attached in the Target CN, Gs-interface is not used
3 Optimize CS call establishment i.e. UE is CS attached in the Target CN According to the invention, it is possible to combine optimizations 1 and 3; or to combine optimizations 2 and 3 above. The above mentioned optimizations will be described in more detail in connection to FIGS. 8-13.

The invention intends to optimize the different variants of Location Area update procedures towards the CS core network when the user equipment UE is not circuit switched attached in the CS core network.

Figure 8:
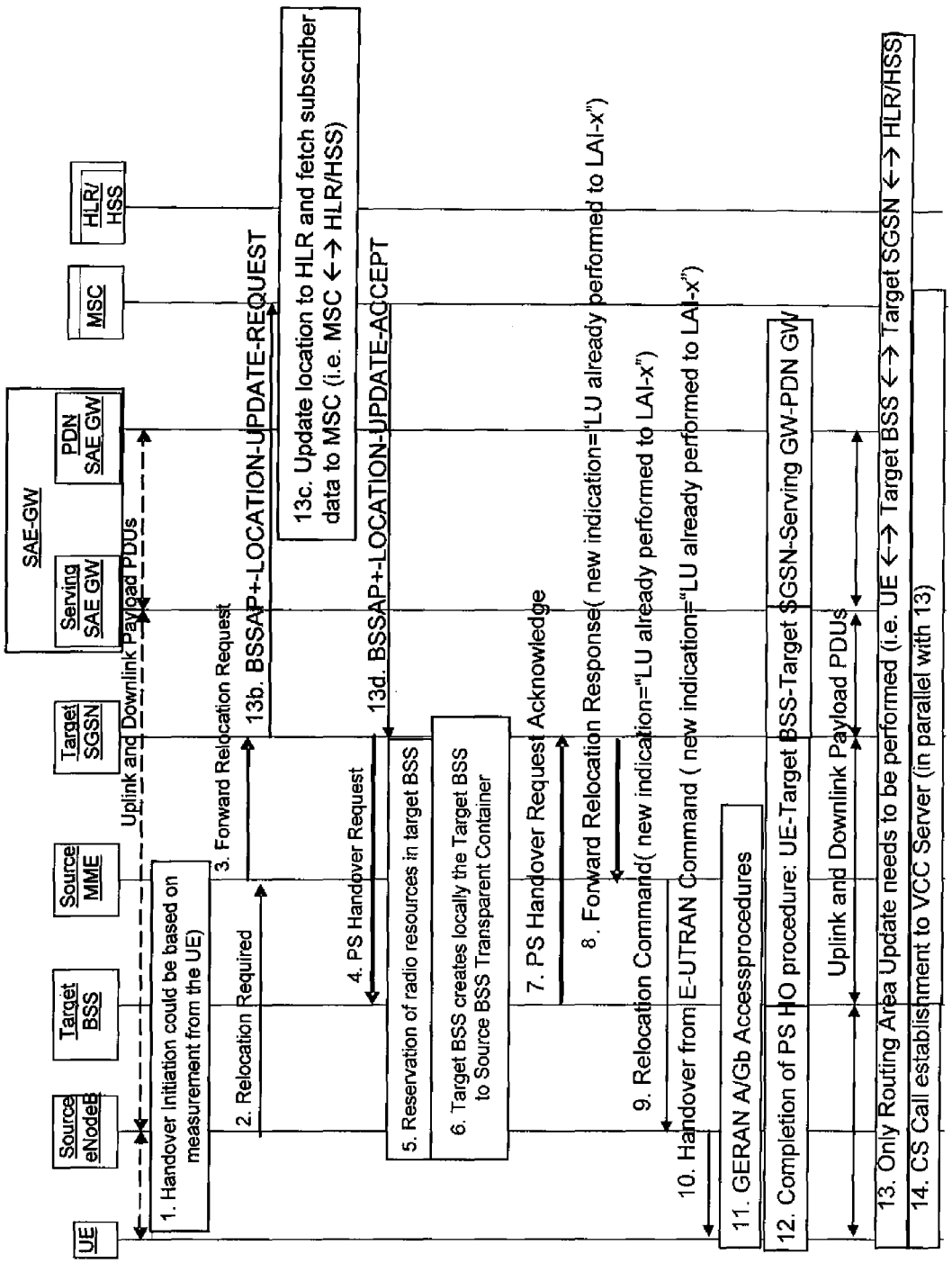
FIG. 8 schematically shows a signal path diagram over optimized Location Area update from target SGSN when Gs-interface is used, according to the invention.

FIG. 8 schematically shows a signal path diagram over optimized Location Area update from the target serving CPRS support node target SGSN when Gs-interface is used, i.e Network Operation Mode I as described in connection to FIG. 3 where the Gs interface between the SGSN and the Mobile Switching Center MSC is supported. This embodiment of the invention intends to optimize Combined Routing Area, RA, and Location Area, LA update when the user equipment UE is not circuit switched attached in the CS core network CN2 and when Gs-interface is used.

Figure 9:
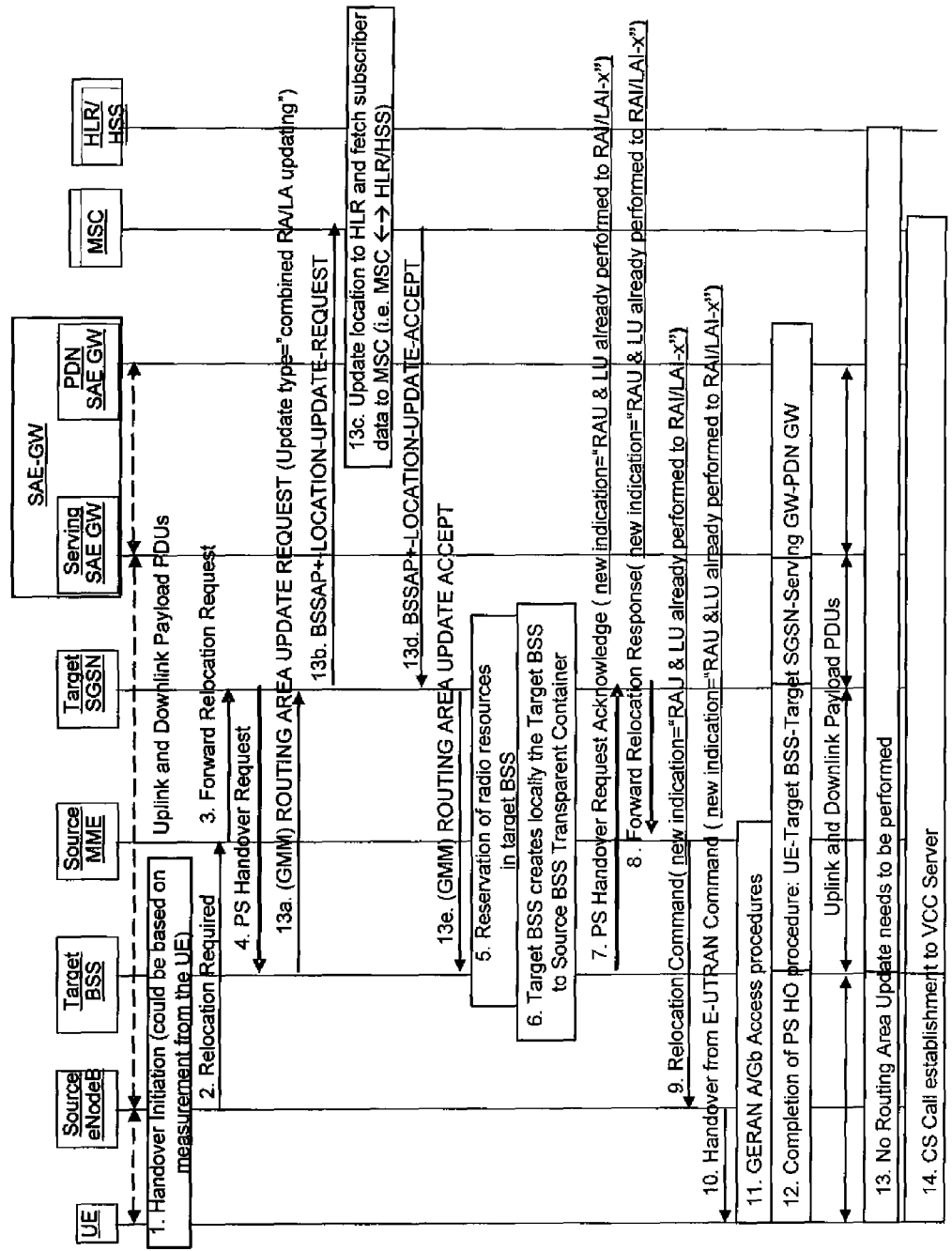
FIG. 9 schematically shows a signal path diagram of optimized Combined Routing Area, RA, and Location Area, LA update from target BSS when Gs-interface is used, according to the invention.

FIG. 8 shows one embodiment where the target serving CPRS support node target SGSN performs the Location Update over the Gs-interface on behalf of the user equipment UE already during PS handover preparation phase. Another embodiment is shown in FIG. 9 where the target Base Station System target BSS instead triggers the Combined Routing Area and Location Update for the user equipment UE. For both cases, the main purpose is to get the needed UE profile information loaded into the Mobile Switching Center MSC to enable establishment of CS calls.

As is shown in FIG. 8, the optimization can be triggered already after step 3 in FIG. 8, i.e. when the target serving CPRS support node target SGSN receives the Forward Relocation Request message from the source control node source MME. This message contains the International Mobile Subscriber Identity, IMSI, of the user equipment UE and also the target cell identifier including Location Area Information/Identity, LAI. Hence, the target serving CPRS support node target SGSN is capable of indicating the IMSI and the Location Area, LA in which the user equipment UE is to be registered in the Mobile Switching Center MSC. Another important detail is that the user equipment UE needs to be informed about the fact that the user equipment UE already has been registered in the Mobile Switching Center MSC and this is shown in steps 8-10 and as the new indication in FIG. 8. This includes that the user equipment UE is also informed about the Location Area Identity (LAI) where it was registered to and also optionally the user equipment UE is informed about a Temporary Mobile Subscriber Identity, TMSI, if it was allocated for the user equipment UE by the Mobile Switching Center MSC.

The steps performed according to prior art has already been described in connection to FIGS. 1-3. According to FIG. 8, the steps performed according this embodiment of the invention are:

13*b*. The target SGSN transmits a BSSAP+-LOCATION-UPDATE-REQUEST message to the MSC.

13*c*. The MSC transmits an Update location message to the HLR and fetches subscriber data from the HLR/HSS.

13*d*. The MSC transmits a BSSAP+-LOCATION-UPDATE-ACCEPT to the target SGSN.

The difference between prior art and the present invention is that steps 13*b-d* in FIG. 8 are performed before the initial step of step 13 and that steps 13*a*-13*d* are initiated by the target SGSN instead of the user equipment UE. In FIG. 8 steps 13*b*-13*d* are performed after step 3 and before step 5. However, steps 13*b*-13*d* could be performed at any time during the handover preparation phase, i.e. before step 12 is completed. The benefit is that in step 13 only Routing Area Update needs to be performed involving the user equipment UE, the target Base Station System target BSS, the target Serving GPRS Node target SGSN and the home location register HLR/Home Subscriber Server HSS Another difference is that the messages in steps 8, 9 and 10 comprises a new indication comprising information that location update LU has already been performed to Location Area Index LAI-x.

The embodiment according to FIG. 8 also allows for step 14, i.e. the CS Call establishment to VCC Server, to be performed in parallel with step 13.

FIG. 9 schematically shows a signal path diagram of optimized Combined Routing Area, RA, and Location Area, LA update from target BSS when Gs-interface is used, according to the invention;

FIG. 9 shows the other alternative when the Target BSS triggers the Combined Routing Area, RA, and Location Area, LA update towards the Target SGSN on behalf of the user equipment UE. This means then that the SGSN will perform the Location Update towards the Mobile Switching Center MSC using the Gs-interface (i.e. as normally defined for the MM procedures over the Gs-interface). The main purpose is to get the needed UE profile information loaded into the Mobile Switching Center MSC to enable establishment of CS calls.

The user equipment UE is identified by the IMSI in the (Combined) Routing Area Update Request message. The IMSI is passed from the Source RAN (e.g. Source MME) to the Target RAN and CN (e.g. Target BSC and Target SGSN). This means that the target SGSN receives the IMSI in the Forward Relocation Request and the Target BSC receives the IMSI in the PS Handover Request message. In addition, the Target BSS may use a new indication in the above message to inform the Target SGSN (and Mobile Switching Center MSC) that the included IMSI is already authenticated by the network, i.e. that the Combined Routing Area, RA, and Location Area, LA, update created by the RAN on behalf of the user equipment UE and that no further authentication is needed for this transaction. This part serves two purposes, first the Combined Routing Area, RA, and Location Area, LA update can be performed faster and secondly as the target Base Station System target BSS was performing the Combined Routing Area, RA, and Location Area, LA update on behalf of the user equipment UE then the target Base Station System target BSS would not even be able to answer e.g. a possible authentication. Here it is also seen that a specific security mechanism is needed to ensure that normal user equipments UEs are not capable of including the indication that the IMSI is already authenticated by the network.

It is also possible that the target Base Station System Target BSS does not hold all the needed information to create a normal (Combined) Routing Area Update message. Parts of the needed information can be sent from the source transceiver node Source eNodeB or source control plane node source MME to the target Base Station System target BSS using e.g. some transparent container. If all information needed is not available, then the target base station system target BSS will anyhow proceed with the Combined Routing Area, RA, and Location Area, LA update and the indication about network triggering this procedure on behalf of the user equipment UE can be used by the target Serving GPRS Node target SGSN and the Mobile Switching Center MSC to know that parts of this information will be received later. The same principle applies for information available in the target Serving GPRS Node target SGSN for the solution shown in FIG. 8.

In addition, the user equipment UE is again informed in the PS Handover Command message by the target Base Station System target BSS that Combined Routing Area, RA, and Location Area, LA update was performed on behalf of the user equipment UE. This includes that the user equipment UE is also informed about the Location Area Identity (LAI) where it was registered to and also optionally the user equipment UE is informed about a Temporary Mobile Subscriber Identity, TMSI, if it was allocated for the user equipment UE by the Mobile Switching Center MSC. Based on this knowledge, the user equipment UE proceeds with CS Call establishment towards the VCC AS directly after completion of the PS HO (step 14 in FIG. 9).

The steps performed according to prior art has already been described in connection with FIGS. 1-3. According to FIG. 9, the steps performed according this embodiment of the invention are:

13a. The target BSS transmits a (GMM) ROUTING AREA UPDATE REQUEST (Update type="combined RA/LA updating") message to the target SGSN.

13b. The target SGSN transmits a BSSAP+-LOCATION-UPDATE-REQUEST message to the MSC.

13c. The MSC transmits an update location to the HLR and fetches subscriber data to from the HKR/HSS.

13d. The MSC transmits a BSSAP+-LOCATION-UPDATE-ACCEPT message to the target SGSN.

13e. The target SGSN transmits a (GMM) ROUTING AREA UPDATE ACCEPT message to the target BSS.

The difference between prior art and the present invention is that steps 13a-e in FIG. 9 are performed before the initial step of step 13 and that the target Base Station System target BSS takes initiative instead of the user equipment UE. In FIG. 9 steps 13a-13e are performed after step 3 and before step 5. However, steps 13a-13c could be performed at any time during the handover preparation phase, i.e. before step 12 is completed. The benefit is that in step 13 no routing area update needs to be done since this has already been performed due to steps 13a-e.

Another difference is that the messages in steps 7, 8, 9 and 10 comprises a new indication comprising information that routing area update and location update LU has already been performed to Location Area Index LAI-x.

Figure 10:
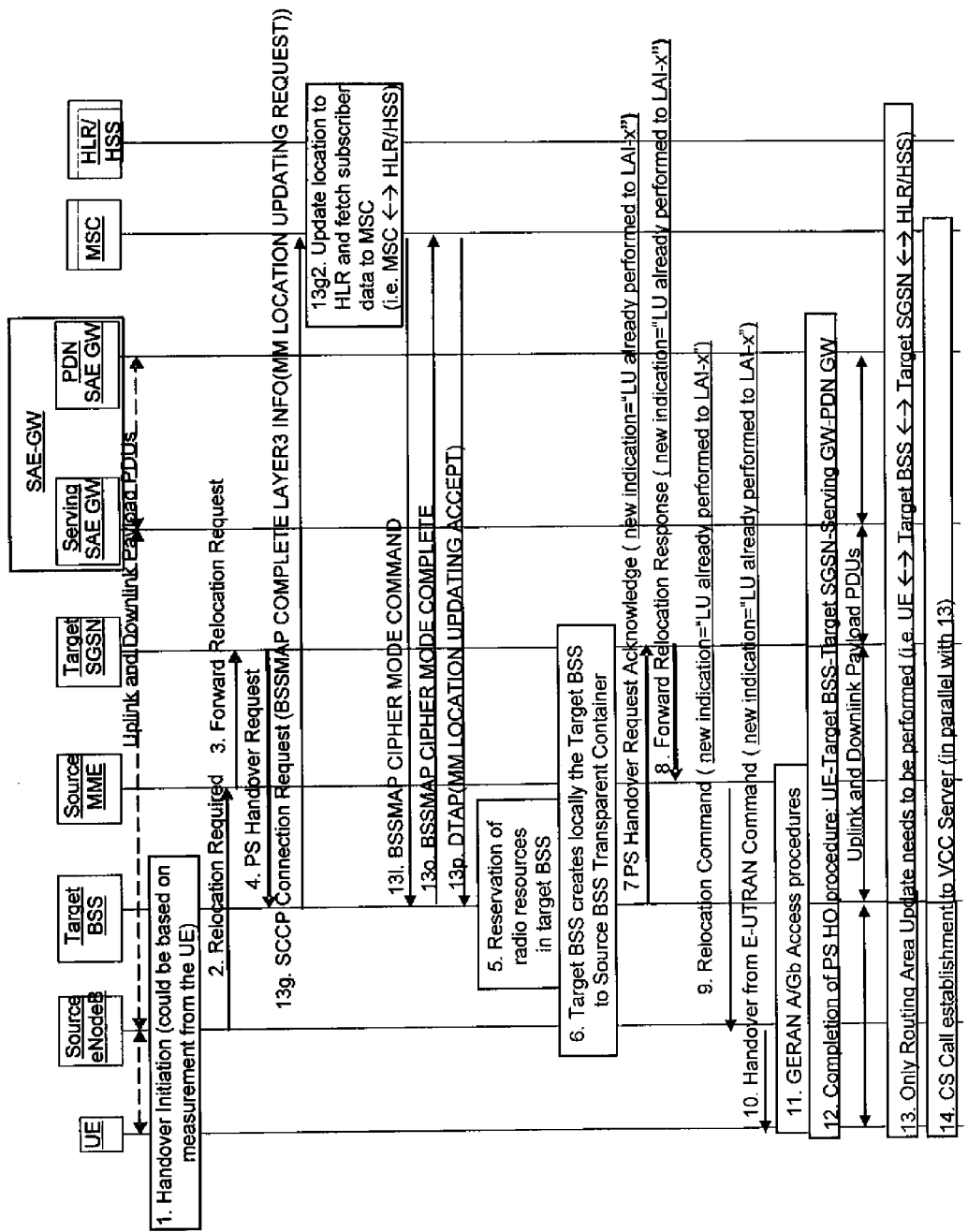
FIG. 10 schematically shows a signal path diagram of optimized "normal" Location Area update; according to the invention.

FIG. 10 schematically shows a signal path diagram of optimized "normal" Location Area update; according to the invention. The method optimizes Location Area update procedure when the user equipment UE is not CS attached in the CS core network CN2 and where Gs-interface is not used.

FIG. 10 shows the main principles of this optimization. The Target Base Station System target BSS triggers the normal Location Area update procedure towards the Mobile Switching Center MSC on behalf of the user equipment UE after step 4 in FIG. 10. The main purpose is to get the needed UE profile information loaded into the Mobile Switching Center MSC to enabled establishment of CS calls. The steps performed and the benefits achieved are similar to the optimization of Combined Routing Area, RA, and Location Area, LA update.

The user equipment UE is identified by the IMSI in the LOCATION UPDATING REQUEST message. In addition, the target Base Station System target BSS may use a new indication in the above message (step 13 in FIG. 10) to inform the Mobile Switching Center MSC that the included IMSI is already authenticated by the network, i.e. that the Location Area update is created by the Radio Access Network RAN on behalf of the user equipment UE and that no further authentication is needed for this transaction. This part serves two purposes, firstly the Location Area update can be performed faster and secondly as the BSS is performing the Location Area update on behalf of the user equipment UE then the target Base Station System target BSS would not even be able to answer e.g. a possible authentication. Here it is also seen that a specific security mechanism is needed to ensure that normal user equipments UEs are not capable of including the indication that the IMSI is already authenticated by the network.

It is also possible that the target Base Station System target BSS does not hold all the needed information to create a normal LOCATION UPDATING REQUEST message. Parts of the needed information can be sent from the source transceiver node source eNodeB or source control plane node source MME to the target Base Station System target BSS using e.g. some transparent container. If all information needed is not available, then the target Base Station System target BSS will anyhow proceed with the Location Area update and the indication about network triggering this procedure can be used by the Mobile Switching Center MSC to know that parts of this information will be received later.

In addition, the user equipment UE is informed in the PS Handover Command message by the target BSS that Location Area update was performed on behalf of the user equipment UE. This includes that the user equipment UE is also informed about the Location Area Identity LAI where it was registered to and also optionally the user equipment UE is informed about a Temporary Mobile Subscriber Identity, TMSI, if it was allocated for the user equipment UE by the Mobile Switching Center MSC. Based on this knowledge, the user equipment UE proceeds with CS Call establishment towards the VCC AS directly after completion of the PS HO (step 13 in FIG. 4).

The steps performed according to prior art has already been described in connection to FIGS. 1, 2 and 4. According to FIG. 10, the steps performed according this embodiment of the invention are:

13*g*. The target BSS transmits a SCCP Connection Request (BSSMAP COMPLETE LAYER 3 INFO(MM LOCATION UPD. REQ.)) message to the MSC.

13*g*2. The MSC transmits an Update location to the HLR and fetches subscriber data from HLR/HSS.

13*l*. The MSC transmits a BSSMAP CIPHER MODE COMMAND message to the target BSS.

13*o*. The target BSS transmits a BSSMAP CIPHER MODE COMPLETE message to the MSC.

13*p*. The MSC transmits a DTAP(MM LOCATION UPDATING ACCEPT) message to the target BSS.

The difference between prior art and the present invention is that steps 13*g*, 13*g*2, 13*l*, 13*o* and 13*p* in FIG. 10 are performed before the initial step of step 13. In FIG. 10 steps 13*g*, 13*g*2, 13*l*, 13*o* and 13*p* are performed after step 3 and before step 5. However, steps 13*g*, 13*g*2, 13*l*, 13*o* and 13*p* could be performed at any time during the handover preparation phase, i.e. before step 12 is completed. The benefit is that in step 13 only Routing Area Update needs to be performed involving the user equipment UE, the target Base Station System target BSS, the target Serving GPRS Node target SGSN and the home location register HLR/Home Subscriber Server HSS.

Another difference is that the messages in steps 7, 8, 9 and 10 comprises a new indication comprising information that location update LU has already been performed to Location Area Index LAI-x.

FIG. 11 schematically shows a signal path diagram of optimized CS Call establishment. The invention intends to optimize CS call establishment when UE is CS attached in the CS core network CN2.

FIG. 11 shows the main principles of this optimization. The Target BSS triggers the normal CS Call establishment procedure towards the Mobile Switching Center MSC on behalf of the user equipment UE already during the PS Handover preparation phase, i.e. after step 4 in FIG. 11. In this case, the optimization is mostly about establishing the SCCP connection between the BSS and the Mobile Switching Center MSC on behalf of the user equipment UE.

In addition, the BSS sends the initial CM SERVICE REQUEST message to the MSC and indicates in the CM Service Type IE that the user equipment UE wishes to establish Mobile originating call. All this is based on the Target BSS making the decision that an Inter-Domain transfer is needed. When the first downlink DTAP message (i.e. could be MM AUTHENTICATION REQUEST in most/all of the cases) from the Mobile Switching Center MSC is received in the Target BSS, it queues this message and waits until the PS HO is completed. After this the BSS waits for the MS to establish the GSM RR connection and send the CM SERVICE REQUEST message and once received, the BSS may instantly reply to the MS by sending the queued AUTHENTICATION REQUEST message (or whichever message was the first message received from the Mobile Switching Center MSC). After this the CS Call establishment continues as normally.

The steps performed according to prior art has already been described in connection to FIGS. 1, 2 and 5. According to FIG. 10, the steps performed according this embodiment of the invention are:

14*b*. The target BSS transmits an SCCP Connection Request (BSSMAP COMPLETE LAYER 3 INFO(CM SERVICE REQUEST)) message to the MSC

14*c*. The MSC transmits a SCCP: Connection Accept (DTAP(MM AUTHENTICATION REQUEST) message to the target BSS.

14*a*. The UE transmits a GSM RR Connection establishment (MM) CM SERVICE REQUEST (Mobile originated call) message to the target BSS.

14*d*. The target BSS transmits a MM AUTHENTICATION REQUEST message to the UE.

14*e*. The UE transmits a MM AUTHENTICATION RESPONSE message to the target BSS.

The CS Call establishment then continues as normally.

The difference between prior art and the present invention is that steps 14*b*, 14*c* and 14*a*, 14*d*, and 14*e* are performed before the initial step of step 14. In FIG. 11 steps 14*b* and 14*c* are performed after step 4 and before step 5 and steps 14*a*, 14*d* and 14*e* are performed after step 13 but before finalisation of the CS call establishment procedure to VCC AS. One benefit of this embodiment is that steps 14*b* and 14*c* prepares the MCS on an early stage so that minimum interruption is achieved for the CS call establishment procedure.

It is also worth mentioning once more that the Location update optimization, i.e. either the Location Area update optimization or the Combined Routing Area and Location Area update optimization, can be performed together with this CS Call establishment optimization. For example, the target SGSN could also trigger the step 13*b* as shown in FIG. 8 already in step 3 in FIG. 11.

The Location update optimization or the Combined Routing Area and Location Area update optimization mechanisms described in this application are also applicable for a normal PS handover case i.e. even when there is no Inter Domain transfer performed. This means that any of the methods described in FIGS. 8, 9 and 10 could be performed by the target Radio Access Network or CS Core Network and the user equipment UE would be informed about this. Once the normal PS handover is executed, the user equipment UE would know that it does not need to perform a Location Update as it was already performed by the target Radio Access Network or CS Core Network.

FIG. 12 show a flow chart of a method according to the invention.

Box 121 shows the initiation of a packet switched handover between the source packet system 703 and the target packet system 704.

Box 122 shows that the user equipment UE initiates a domain switch from the packet switched domain 701 to the circuit switched domain 702.

Box 123 shows that an attachment/registration/update procedure is performed on behalf of the user equipment UE towards the second core network CN2 portion of the circuit switched domain 702 during the handover preparation phase between the source packet system 703 and the target packet system 704. According to the embodiments described in connection to FIGS. 8-11, the attachment/registration/update procedure can be initiated/performed by different units in the network dependent on already described parameters, for example. Network operation mode.

Box 124 shows that the second radio access network RAN2 portion target BTS/BSC of the circuit switched domain 702 performs a signalling connection establishment on behalf of user equipment UE for an originated call towards the second core network portion CN2 in the Mobile Switching Center MSC of the circuit switched domain 702 for the user equipment UE before the handover between the source packet system 703 and the target packet system 704 is executed. The step shown in Box 704 can performed during the execution of the steps shown in Boxes 702 and 703 or can be performed alone, i.e. without the steps shown in Boxes 702 and 703 being executed.

Box 125 shows that the domain switch from the packet switched domain 701 to the circuit switched domain 702 and the handover between the source packet system 703 and the target packet system 704 is executed. These two steps do not have to be executed simultaneously, but can be executed at different points in time. The latter is obvious form the embodiments described in connection to FIGS. 8-11

The invention claimed is:

1. A method for handover of a User Equipment (UE) from a source packet system to a target packet system in a packet switched domain of a wireless communications network while transferring the UE from the packet switched domain to a circuit switched domain, wherein the source packet system includes a Mobility Management Entity (MME), the target packet system includes a target Serving GPRS Support Node (target SGSN) and a target base station system (target BSS), and the circuit switched domain includes a Mobile Switching Center (MSC), the method comprising the steps of:

the target SGSN receiving from the MME in the source packet system, a Forward Relocation Request message requesting handover from the source packet system to the target packet system, wherein the Forward Relocation Request message includes an International Mobile Subscriber Identity (IMSI) of the UE and a target cell identifier including a Location Area Identity (LAI);

the target SGSN performing a Location Update on behalf of the UE during a handover preparation phase by sending a Location Update request to the MSC on a Gs interface, the Location Update request including the IMSI of the UE and the LAI of the target cell identifier, wherein the MSC updates the UE location in a Home Location Register/Home Subscriber Server (HLR/HSS) and retrieves subscriber information from the HLR/HSS;

the target SGSN sending a packet-switched Handover Request to the target BSS;

the target SGSN sending to the UE via the MME, an indication that the Location Update has already been performed for the LAI of the target cell identifier;

completing the handover from the source packet system to the target packet system after the Location Update has been performed; and performing only a Routing Area Update after completion of the handover.

2. A method for handover of a User Equipment (UE) from a source packet system to a target packet system in a packet switched domain of a wireless communications network while transferring the UE from the packet switched domain to a circuit switched domain, wherein the source packet system includes a Mobility Management Entity (MME), the target packet system includes a target Serving GPRS Support Node (target SGSN) and a target base station system (target BSS), and the circuit switched domain includes a Mobile Switching Center (MSC), the method comprising the steps of:

the target SGSN receiving from the MME in the source packet system, a Forward Relocation Request message requesting handover from the source packet system to the target packet system, wherein the Forward Relocation Request message includes an International Mobile Subscriber Identity (IMSI) of the UE and a target cell identifier including a Location Area Identity (LAI);

the target SGSN sending a packet-switched Handover Request to the target BSS, the Handover Request including the IMSI of the UE;

the target BSS triggering a Combined Routing Area and Location Area Update toward the target SGSN on behalf of the UE during a handover preparation phase;

the target SGSN sending a Location Update request to the MSC on a Gs interface, the Location Update request including the IMSI of the UE and the LAI of the target cell identifier, wherein the MSC updates the UE location in a Home Location Register/Home Subscriber Server (HLR/HSS) and retrieves subscriber information from the HLR/HSS;

reserving radio resources for the UE in the target BSS;

the target BSS sending to the UE via the target SGSN and the MME, an indication that the Location Update has already been performed for the LAI of the target cell identifier; and completing the handover from the source packet system to the target packet system after the Location Update has been performed and without having to perform a Routing Area Update after completion of the handover.

3. The method according to claim 2, wherein the step of the target BSS triggering a Combined Routing Area and Location Area Update includes the target BSS informing the target SGSN that the IMSI of the UE has already been authenticated.

4. A method for handover of a User Equipment (UE) from a source packet system to a target packet system in a packet switched domain of a wireless communications network while transferring the UE from the packet switched domain to a circuit switched domain, wherein the source packet system includes a Mobility Management Entity (MME), the target packet system includes a target Serving GPRS Support Node (target SGSN) and a target base station system (target BSS), and the circuit switched domain includes a Mobile Switching Center (MSC), the method comprising the steps of:

the target SGSN receiving from the MME in the source packet system, a Forward Relocation Request message requesting handover from the source packet system to the target packet system, wherein the Forward Relocation Request message includes an International Mobile Subscriber Identity (IMSI) of the UE and a target cell identifier including a Location Area Identity (LAI);

the target SGSN sending a packet-switched Handover Request to the target BSS, the Handover Request including the IMSI of the UE;

the target BSS sending on behalf of the UE during a handover preparation phase, a Location Update request to the MSC in a Signaling Connection Control Part (SCCP) Connection Request message, the Location Update request including the IMSI of the UE and the LAI of the target cell identifier, wherein the MSC updates the UE location in a Home Location Register/Home Subscriber Server (HLR/HSS) and retrieves subscriber information from the HLR/HSS;

reserving radio resources for the UE in the target BSS;

the target BSS sending to the UE via the target SGSN and the MME, an indication that the Location Update has already been performed for the LAI of the target cell identifier;

completing the handover from the source packet system to the target packet system after the Location Update has been performed; and performing only a Routing Area Update after completion of the handover.

5. The method according to claim 4, wherein the step of the target BSS sending a Location Update request to the MSC on behalf of the UE includes the target BSS informing the MSC that the IMSI of the UE has already been authenticated.

6. A method for optimizing circuit-switched (CS) call establishment for a User Equipment (UE) attached in a CS core network, wherein the UE is being handed over from a source packet system to a target packet system in a packet switched domain of a wireless communications network while transferring the UE from the packet switched domain to a circuit switched domain, wherein the source packet system includes a Mobility Management Entity (MME), the target packet system includes a target Serving GPRS Support Node (target SGSN) and a target base station system (target BSS), and the circuit switched domain includes a Mobile Switching Center (MSC) in the CS core network, the method comprising the steps of:

the target SGSN receiving from the MME in the source packet system, a Forward Relocation Request message requesting handover from the source packet system to the target packet system, wherein the Forward Relocation Request message includes an International Mobile Subscriber Identity (IMSI) of the UE and a target cell identifier including a Location Area Identity (LAI);

the target SGSN sending a packet-switched (PS) Handover Request to the target BSS, the PS Handover Request including the IMSI of the UE;

the target BSS sending on behalf of the UE during a handover preparation phase, a Service request to the MSC in a Signaling Connection Control Part (SCCP) Connection Request message over an SCCP connection between the target BSS and the MSC, the Service request including the IMSI of the UE and an indication that the UE requests to establish a mobile originated call;

the MSC sending an authentication request to the target BSS in an SCCP Connection Accept message;

the target BSS queuing the authentication request until the PS handover is completed and a Service request is received from the UE for the mobile originated call;

completing the PS handover;

performing a Location Update procedure towards the MSC and a Routing Update procedure towards the target SGSN;

the target BSS receiving the Service request from the UE for the mobile originated call;

the target BSS sending the queued authentication request to the UE;

the target BSS receiving an authentication response from the UE; and establishing the CS call.

\* \* \* \* \*

UNITED STATES PATENT AND TRADEMARK OFFICE
CERTIFICATE OF CORRECTION

| | | |
|---|---|---|
| PATENT NO. | : 8,948,125 B2 | |
| APPLICATION NO. | : 12/812391 | |
| DATED | : February 3, 2015 | |
| INVENTOR(S) | : Hallenstål et al. | |

It is certified that error appears in the above-identified patent and that said Letters Patent is hereby corrected as shown below:

On the title page, item 75, under "Inventors", in Column 1, Line 1, delete "Hallenstal," and insert -- Hallenstål, --, therefor.

In the specification

In Column 5, Line 34, delete "(LTE 4" and insert -- (LTE → --, therefor.

In Column 9, Line 38, delete "CPRS" and insert -- GPRS --, therefor.

In Column 9, Line 60, delete "CPRS" and insert -- GPRS --, therefor.

In Column 10, Line 2, delete "CPRS" and insert -- GPRS --, therefor.

In Column 10, Line 13, delete "CPRS" and insert -- GPRS --, therefor.

In Column 10, Line 18, delete "CPRS" and insert -- GPRS --, therefor.

Signed and Sealed this
Twenty-ninth Day of December, 2015

Michelle K. Lee
*Director of the United States Patent and Trademark Office*